United States Patent
Corrao et al.

(10) Patent No.: US 8,121,073 B2
(45) Date of Patent: Feb. 21, 2012

(54) FUTURE FORWARDING ZONES IN A NETWORK

(75) Inventors: Ann Corrao, Raleigh, NC (US); Gregg William Machovec, Cary, NC (US); Brian Marshall O'Connell, Cary, NC (US); Brian James Snitzer, Lancaster, PA (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 12/139,060

(22) Filed: Jun. 13, 2008

(65) Prior Publication Data

US 2009/0310510 A1    Dec. 17, 2009

(51) Int. Cl.
*H04L 12/54* (2006.01)
(52) U.S. Cl. ......... 370/328; 370/351; 370/389; 370/428
(58) Field of Classification Search .............. 370/229, 370/328
See application file for complete search history.

(56) References Cited

U.S. PATENT DOCUMENTS

| | | | |
|---|---|---|---|
| 7,123,722 B2 * | 10/2006 | Filipi-Martin et al. ....... | 380/279 |
| 2003/0117966 A1 * | 6/2003 | Chen ............... | 370/255 |
| 2004/0246900 A1 * | 12/2004 | Zhang et al. .......... | 370/238 |
| 2005/0030921 A1 * | 2/2005 | Yau ................. | 370/329 |
| 2005/0090201 A1 * | 4/2005 | Lengies et al. .......... | 455/41.2 |
| 2005/0198531 A1 * | 9/2005 | Kaniz et al. ............ | 713/201 |
| 2005/0286464 A1 * | 12/2005 | Saadawi et al. ........... | 370/328 |
| 2008/0261580 A1 * | 10/2008 | Wallentin et al. .......... | 455/418 |
| 2009/0046678 A1 * | 2/2009 | Lee et al. ............ | 370/338 |
| 2009/0168676 A1 * | 7/2009 | Olson .............. | 370/311 |

OTHER PUBLICATIONS

Haas et al., The Zone Routing Protocol (ZRP) for Ad Hoc Networks, Internet Draft, <draft-ietf-manet-zone-zrp-02.txt>, Jun. 1999.*
BGP BGP is a protocol used to exchange / share routing information versus an exchange in messages per say. BGP uses so-called messaging to establish communications and exchange routes via a TCP/IP connection between groups of routers / endpoints.
Mohacsi, J., IPv6 Workshop, IPv6 DISSemination and Exploitation, pp. 1-105.

* cited by examiner

*Primary Examiner* — Huy Vu
*Assistant Examiner* — Maria Sekul
(74) *Attorney, Agent, or Firm* — Yudell Isidore Ng Russell PLLC

(57) ABSTRACT

A method, system, and computer program product for enabling the transmission of data from a mobile device to a target device via one or more carrier mobile devices, in a communication network. A proxy mobile carrier (PMC) utility facilitates transmission of data from the originating mobile device to a target device in a network which is inaccessible to the originating mobile device. The PMC utility employs a collection of enhanced transmission enabling components (ETECs) to enable the data transfer via one or more carrier mobile devices. The ETECs include a message creation component, a network zone identification component, a future forwarding zone prediction component, a message acceptor component, a storage component, an inter-node communication component, and a message delivery component. By initiating specific interactions between the ETECs, the PMC utility facilitates the transmission of data from the mobile device to the target device via carrier mobiles.

18 Claims, 8 Drawing Sheets

Figure 3

| Network | Network Mask | Visits | Last Visit |
|---|---|---|---|
| 199.84.154.0 | 255.255.255.0 | 23 | 1181328829545 |
| 205.205.3.0 | 255.255.255.0 | 1 | 1181328223321 |
| 205.205.2.0 | 255.255.255.0 | 12 | 1181328223219 |
| 207.35.76.32 | 255.255.255.254 | 100 | 1181328229580 |
| 209.148.91.128 | 255.255.255.240 | 1 | 1181328431113 |
| 207.35.76.0 | 255.255.255.254 | 1 | 1181328223313 |

FUTURE FORWARDING ZONES IN A NETWORK

BACKGROUND

1. Technical Field

The present invention generally relates to data communication networks and in particular to establishing connectivity in data communication networks.

2. Description of the Related Art

Mobile computing devices frequently move between physical regions and/or network zones. Example mobile devices include laptops, cellular phones, personal digital assistants, smart-phones, and ultra mobile personal computers (UMPCs). Many of these devices are capable of forming networks called mobile ad-hoc networks MANet). MANet is a self-configuring network of mobile routers (and associated hosts) connected by wireless links, the union of which form an arbitrary topology. The routers are free to move randomly and organize themselves arbitrarily; Thus, the network's wireless topology may change rapidly and unpredictably. Such a network may operate in a stand-alone fashion, or may be connected to the larger Internet.

It is not presently possible to route a message to a network to which no path presently exists. It is common for mobile device users to reside in physical and network zones without the connectivity required to transmit a message to a destination. In such situations it is also common for the user to be within range of other mobile computing devices prior to establishing the required network path. Currently, an attempt to transmit such a message would result in transmission failure. For example, it is common for an employee to have no network path to the (employee's) company's intranet, yet still wish to transmit a message to a computing/communicating resource within the intranet. However, it is not possible for a mobile device to transmit a message to a host on a network for which the device does not have path. The operator of the device is required to wait until a path exists to the required network.

SUMMARY OF ILLUSTRATIVE EMBODIMENTS

Disclosed are a method, system, and computer program product for enabling the transmission of data from a mobile device to a target device via one or more carrier mobile devices, in a communication network. A proxy mobile carrier (PMC) utility facilitates transmission of data from the originating mobile device to a target device in a network which is inaccessible to the originating mobile device. The PMC utility employs a collection of enhanced transmission enabling components (ETECs) to enable the data transfer via one or more carrier mobile devices. The ETECs include a message creation component, a network zone identification component, a future forwarding zone prediction component, a message acceptor component, a storage component, an inter-node communication component, and a message delivery component. By initiating specific interactions between the ETECs, the PMC utility facilitates the transmission of data from the mobile device to the target device via carrier mobiles.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a table depicting the information placed in the storage component (of a network server) as a mobile device moves and records zone interactions, according to one embodiment;

DETAILED DESCRIPTION OF AN ILLUSTRATIVE EMBODIMENT

Figure 1:
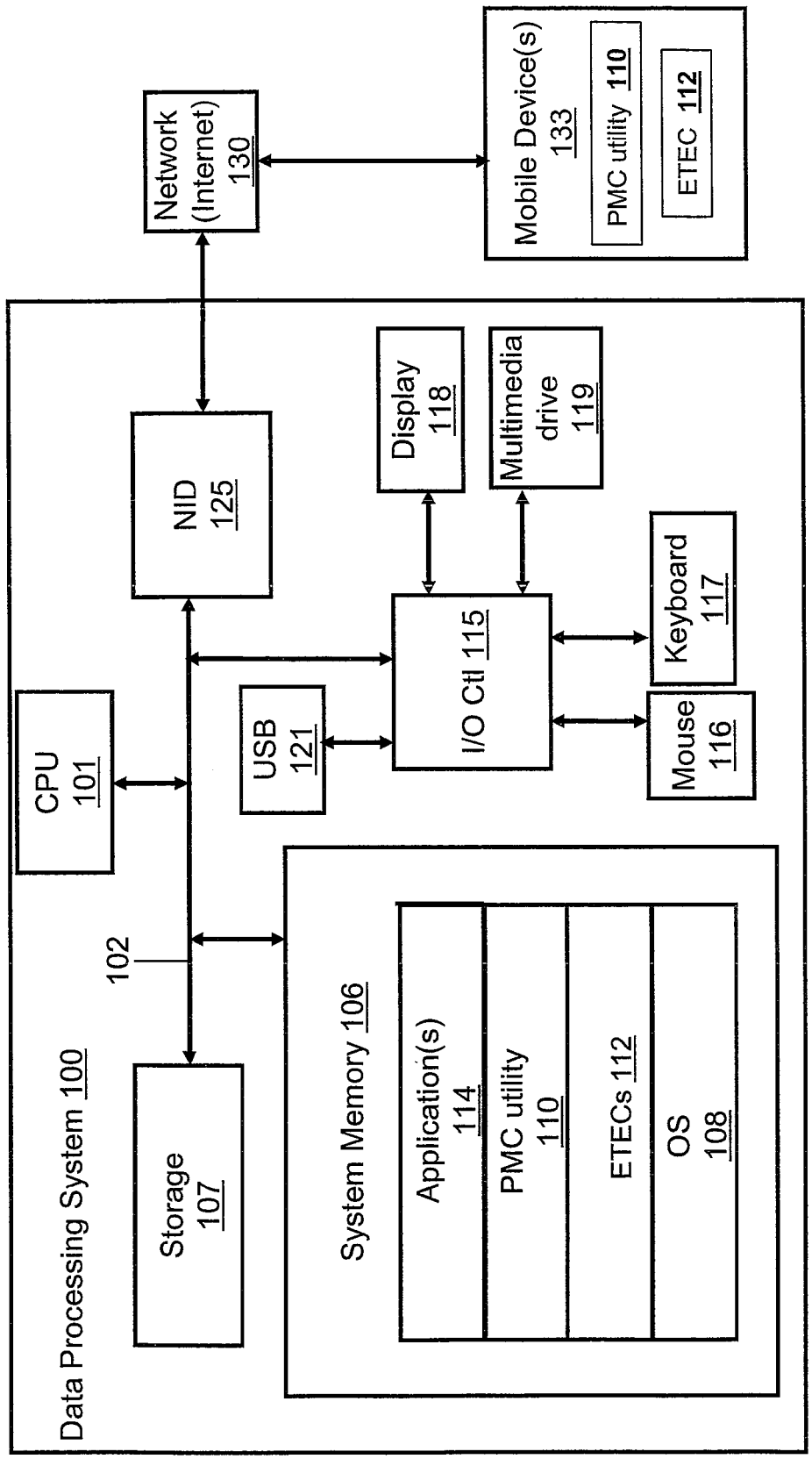
FIG. 1 is a block diagram representation of a data processing system, according to one embodiment of the invention.

The illustrative embodiments provide a method, system, and computer program product for enabling the transmission of data from a mobile device to a target device via one or more carrier mobile devices, in a communication network. A proxy mobile carrier (PMC) utility facilitates transmission of data from the originating mobile device to a target device in a network which is inaccessible to the originating mobile device. The PMC utility employs a collection of enhanced transmission enabling components (ETECs) to enable the data transfer via one or more carrier mobile devices. The ETECs include a message creation component, a network zone identification component, a future forwarding zone prediction component, a message acceptor component, a storage component, an inter-node communication component, and a message delivery component. By initiating specific interactions between the ETECs, the PMC utility facilitates the transmission of data from the mobile device to the target device via carrier mobiles.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to FIG. 1, there is depicted a block diagram representation of a data processing system (DPS) 100 (and connected network). DPS 100 may represent a server in a network communication environment which enables transfer of data by a carrier mobile device(s). DPS 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. Multimedia drive 119 and USB hub 12*i* may operate as both input and output (storage) mechanisms. DPS 100 also comprises storage 107, within which data/instructions/code may be stored.

DPS 100 is also illustrated with a network interface device (NID) 125, with which DPS 100 connects to one or more mobile devices 133 via access network 130 (, such as the Internet). In the described embodiments, network 130 is a worldwide collection of networks and gateways that utilize (the Transmission Control Protocol/Internet Protocol (TCP/IP) suite of) [one or more] protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, GNU®/Linux®, registered trademarks of the Free Software Foundation and Linus Torvalds, or AIX®, a registered trademark of IBM), applications 114, Enhanced Transmission Enabling Components (ETECs) 112 and proxy mobile carrier (PMC) utility 110. In actual implementation, applications ETECs 112 and PMC utility 110 may be combined as a single application collectively providing the various functions of each individual software component when the corresponding code is executed by the CPU 101. Certain segments of ETECs 112 and/or PMC utility 110 may be implemented within mobile devices/stations (MS) to facilitate the inventive features of the embodiment. For simplicity, PMC utility 110 is illustrated and described as a stand alone or separate software/firmware component, which provides specific functions, as described below.

CPU 101 executes PMC utility 110 as well as OS 108, which supports the user interface features of PMC utility 110. In the illustrative embodiment, PMC utility 110 generates/provides several graphical user interfaces (GUI) to enable user interaction with, or manipulation of, the functional features of the utility (110). Among the software code/instructions provided by PMC utility 110, and which are specific to the invention, are: (a) code for initiating a request for the future transmission of data from a mobile device to a target device via one or more carrier mobile devices; (b) code for utilizing one or more enhanced transmission enabling components (ETECs); and (c) code for facilitating the transmission of data from a mobile device to a target device by interaction of multiple ETECs. For simplicity of the description, the collective body of code that enables these various features is referred to herein as PMC utility 110. According to the illustrative embodiment, when CPU 101 executes PMC utility 110, DPS 100 initiates a series of functional processes that enable the above functional features as well as additional features/functionality, which are described below within the description of FIGS. 2-8.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
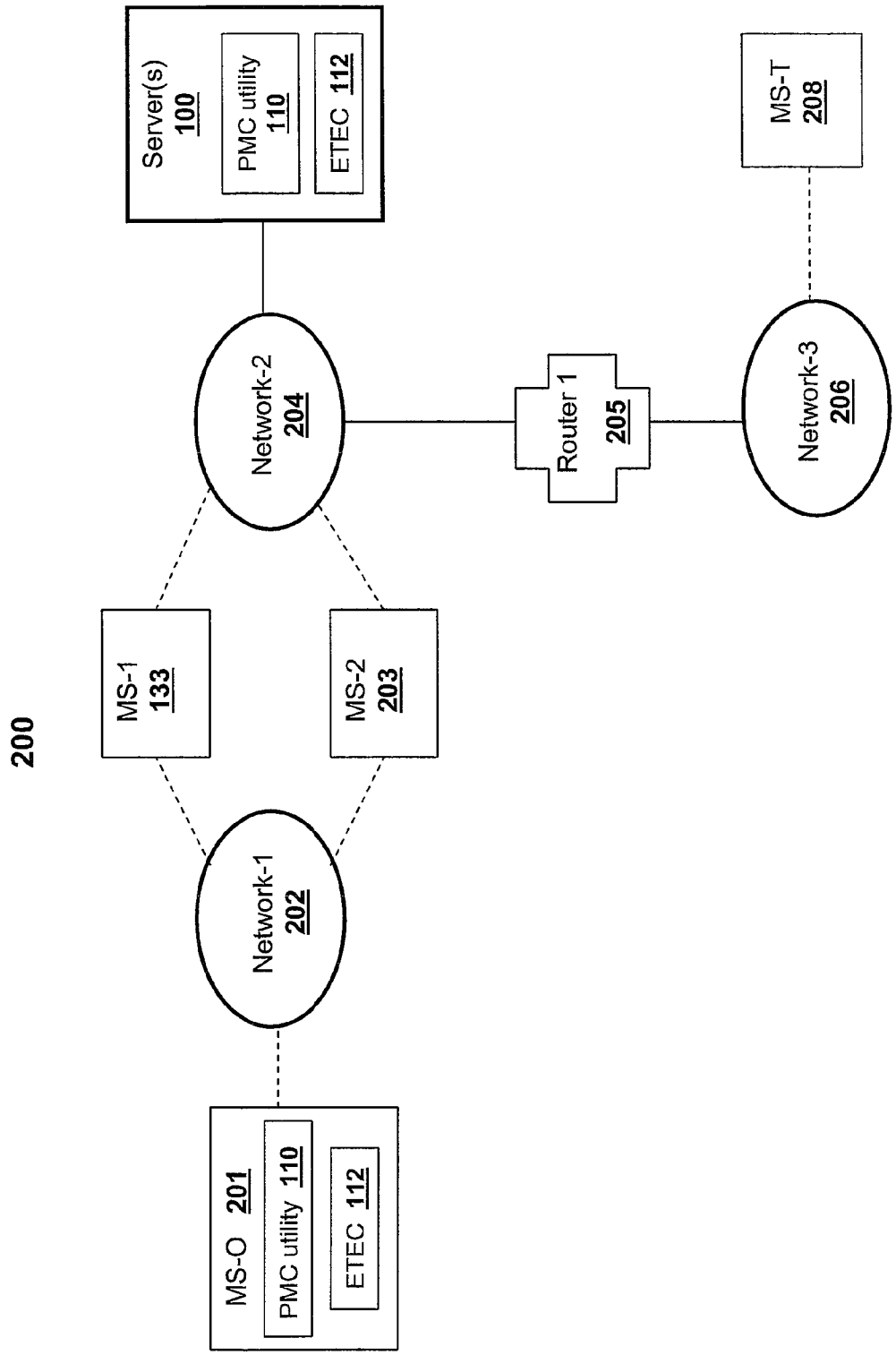
FIG. 2 illustrates a network environment in which an initiating device communicates with a target device via a carrier mobile(s), according to one embodiment.

With reference now to FIG. 2, a network environment is illustrated, in which an initiating device communicates with a target device via carrier mobile(s), according to one embodiment. Network environment 200 comprises originating mobile device, MS-O 201, which connects wirelessly to Network-1 202. MS-O 201 is able to connect to carrier mobiles, MS-1 133 and MS-2 203 which both connect wirelessly to Network-1 202. MS-1 133 and MS-2 203 may also connect wirelessly to Network-2 204. Also connected to Network-2 204 is Server 100 and router-1 205, which is connected to Network-3 206. Connecting wirelessly to Network-3 206 is target mobile device/station, MS-T 208.

PMC utility 110 and ETECs 112 (both illustrated within MS-O 201 and Server 100) enable originating mobile device, MS-O 201, to transmit a message (and/or data) to target mobile device/station (MS-T 208) via one or more carrier mobiles (e.g., MS-1 133 and MS-2 203). In addition, carrier mobiles, MS-1 133 and MS-2 203, as well as target device MS-T 208, may include PMC utility 110 and specific components of ETECs 112. However, the inclusion of PMC utility 110 and specific components of ETECs 112 within MS-1 133, MS-2 203 and MS-T 208 is not explicitly shown in network environment 200.

ETECs 112 is a collection of components which include: a message creation component, a network zone identification component, a future forwarding zone prediction component, a message acceptor component, a storage component, an inter-node communication component, and a message delivery component.

The Message Creation Component facilitates the creation of messages for transmission between communicating and/or computing entities. Messages consist of text and/or data converted to a binary format suitable for transmission to other communicating devices. Messages often are divided into two sections, the header and the body. It is common for the header to contain descriptive information or meta-data about the message and the body. The body, sometimes called the payload, contains the data intended for transmission. PMC utility 110 augments known messaging protocols, like TCP/IP, to include additional message meta-data in the header section.

One such augmentation is addition of a Universally Unique Identification (UUID) for each message. The UUID enables a number of advanced features via additional meta-data including security information, cryptography keys and message control data such as urgency.

The Network Zone (Region) Identification Component (NZIC) enables storage of network details when a mobile device enters a network space. The network details are recorded in the storage component. A network zone or region is a network space comprised of a set of unique IP addresses reachable from within that space. The zone may or may not be an entire subnetwork. It is common for mobile devices to move in and out of different subnetworks. The network may be uniquely identifiable by its topology, reachable IP addresses, media access control (MAC) addresses available, the reachable topology described by the gateway router, or the MAC addresses of specific computing elements such as routers within the zone. In the preferred embodiment a network zone is identified by the reachable IP addresses from within that zone. PMC utility 110 or NZIC records entrance into network zones in the storage component. Additionally, upon entrance to a zone the system consults the storage component to detect if the device has any messages for delivery to that zone. If so, the message delivery component is invoked for every message to be delivered within that zone.

The Future Forwarding Zone Prediction Component (FFZPC) analyzes information stored in the storage component to predict which network zones the devices may enter in the future based on previously recorded zone interactions. The FFZPC may assign discrete rankings for the probability of entering zones. For example a zone with a high probably of near term entrance may be assigned a ranking of 1, whereas a zone with a low probability of entrance may be assigned a higher number. These probabilities are transmitted to the message originator during initial message hand-off negotiations and transmitted during inter-node communications.

The message acceptor (MA) component communicates with message originators and may either accept or reject messages for future delivery. The MA component has several sub-components including authentication, negotiation, and notification sub-components.

The Authentication Sub-Component enables mobile devices to provide authentication to each other in order to proceed with a transfer of data. In one embodiment, message originators may be required to authenticate themselves before messages are accepted. Such embodiments may use authentication to restrict message transfers to arbitrary groups, such as those with the same employer, same university, or other such groupings of people. Alternately, in another embodiment, if a message contains a public key within the message header, the message may only be accepted if the originating device contains the private key to decrypt the message.

The Negotiation Sub-Component communicates with the message originator to determine if a message will be accepted for delivery to a future network zone. In most embodiments, the originator presents the message, which includes the future forwarding zone, for delivery. This component consults the zone prediction component to ascertain the likelihood of entering the future forwarding zone. In some embodiments, if the likelihood is below a preset threshold, the system may reject the message. In other embodiments, the system may return the probability to the message originator, so the originator may decide if the message is transmitted through this node (i.e., a carrier mobile device within a network zone). If both parties agree to transmit the message, the negotiation component places the message within the storage component for future delivery and invokes the notification component. In some advanced components, if the storage system is full, the negotiation component, depending on likelihood of deliveries, may offer to swap a message (from originator) already accepted for future delivery with the message originator to make room for the new message.

The Notification Sub-Component may provide notification to the owner of the device that a message has been accepted or rejected by the system for future delivery. In addition, some embodiments may not accept the message until the device's owner has communicated an approval to accept the message with the notification component. Embodiments may differ but notification may take several forms including but not limited to: sounds, vibration, or a flashing light.

The Storage Component stores and indexes information required for operation as described by the illustrative embodiments. The Storage Component contains zone storage, message storage, and expiration sub-components/methods.

The zone storage sub-component stores information about the entrance to network zones. The zone storage sub-component stores the zone network details with associated information including the number of times the device has been in that zone and the last time that zone was accessible. This information is used by the zone prediction system to determine the probability of entering a zone in the future.

The message storage sub-component contains messages accepted for delivery. The message storage sub-component stores the message UUID, acceptance timestamp, delivery status and message data. In some embodiments, the timestamp is used to expire messages after a preset duration. The delivery status is used during inter-node communication to inform other systems carrying the same message that the message has been previously delivered.

The expiration sub-component expires entries within the storage component. Zones that have not been accessed in a preset period of time and messages stored for a preset time period may be removed by the expiration system. In other embodiments, the expiration sub-component may not remove entries based on duration rather removed the least recently used entries when a request for storage occurs. In other embodiments, the expiration sub-component may not remove items based mainly on a preset time period or a "least recently used" entry characteristic. However, the expiration sub-component may remove entries based on a need for storage space.

The Inter-Node Communication (INC) Component facilitates inter-node communication, which may occur when any two network nodes discover each other. Present networking protocols provide methods for devices to discover each other. The INC component enhances the likelihood of message delivery to future zones and reduces the storage needs of components. Upon node discovery the systems access their storage components, comparing messages for future delivery. In some embodiments, if the remote node has a higher likelihood of entering a zone a message is destined for, that message may be transmitted to the remote node for delivery. At such a time, some embodiments may remove the entry from their storage components while others may retain the message for delivery. In addition, a list of recently delivered message UUIDs is communicated between the two nodes. If the other node contains that message for delivery, the storage component is updated to mark that message as delivered.

The message delivery system uses known methods to deliver messages within a currently attached network zone. Message delivery is a standard feature of inter-networking protocols such as TCP/IP, IPX, SNA, bluetooth, etc. The messages are delivered to the destination specified by the message originator.

Private network addresses such as addresses in the class A range of 19.x.x.x and other addresses in the class C range of 192.168.X.X are not universally unique. As such, the methods described above for network zone identification are insufficient to uniquely identify messages intended for private network zones. It is appreciated that one method for identifying unique zones is to add an additional field containing the Media Access Control (MAC) address of the network gateway. Media Access Control addresses are pseudo-unique and the likelihood of improper message delivery due to duplicate MAC addresses is low enough that this method is acceptable for reliable message delivery. For delivery to private network addresses the message originator requires knowledge of the MAC address of the network gateway for the target network and the message carrier must verify the MAC address prior to delivery of the message to the target network.

The Message Expiration component may be optionally implemented and/or included within ETECs 112. Such a component may expire messages after a specified time or number of network zones entered. In one embodiment, the message originator specifies a duration for which the message is valid and, upon exceeding that duration, the carrier(s) of the message may expire the message from the storage component. Such an embodiment may require an additional header in the message to contain the expiration information. Other embodiments may expire messages after the messages have traveled between a number of network zones without final delivery of the message.

FIG. 3 is a table depicting the information placed in the storage component as a mobile device moves and records zone interactions, according to one embodiment. Table 300 comprises multiple network entries 301 of which first network 202 and second network 204 are referenced. Table 300 also comprises a record of the number of network visits (entrances to a network) by a mobile device including first entrance total 304 and second entrance total 305. Also illustrated in table 300 is a final time-stamp record, including final timestamp-1 306 and final timestamp-2 307.

The Network Zone/Region Identification Component (NZIC) enables storage of network details when a mobile device enters a network space. The network details are recorded in the storage component. A network zone or region is a network space comprised of a set of unique IP addresses reachable from within that space.

According to table 300, the mobile device (e.g., mobile device 133) has visited first network 202 (IP address 199.84.154.0) a total of 23 times (during a specific time period) as illustrated by first entrance total 304. The time of the most recent visit by the mobile device is indicated by final timestamp-1 306. At second network 204 (IP address 207.35.76.32), the mobile device has accrued 100 visits. A most recent visit by the mobile device is indicated by final timestamp-2 307.

Figure 4:
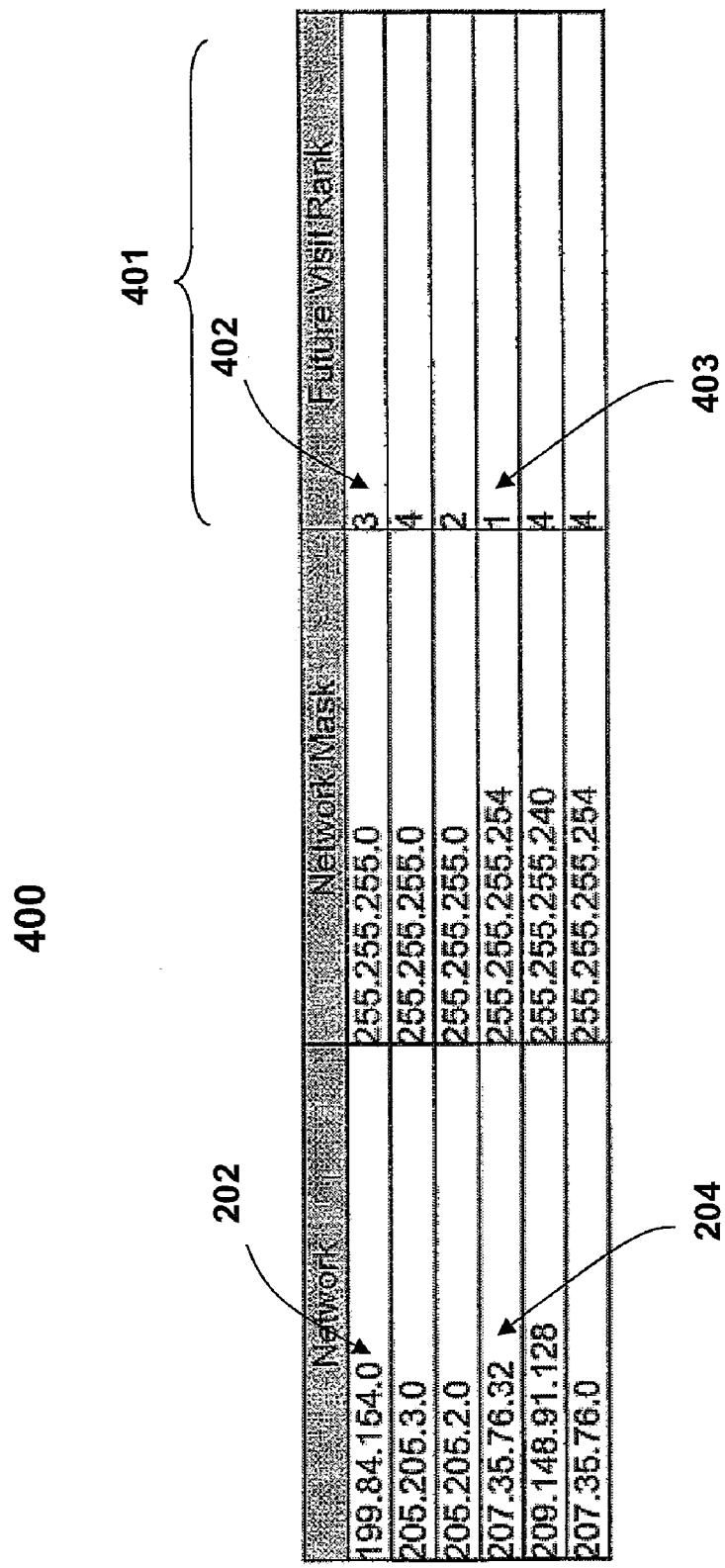
FIG. 4 is a table depicting the discrete rankings for the probability of entering network zones, according to one embodiment.

FIG. 4 is a table depicting the discrete rankings for the probability of entering network zones, according to one embodiment. Table 400 comprises first network 202 and second network 204. Table 400 also comprises future visit rankings 401 of which first future visit rank (FVR) 402 and second FVR 403 are referenced.

The FFZPC analyzes information (table 300) stored in the storage component to predict which network zones the devices may enter in the future based on previously recorded zone interactions. The FFZPC may assign discrete rankings for the probability of entering zones. For example a zone with a high probably of near term entrance may be assigned a ranking of 1, whereas a zone with a low probability of entrance may be assigned a higher number. These probabilities are transmitted to the message originator during initial message hand-off negotiations and also transmitted during inter-node communications.

Based on an analysis of the zone information in table 300, the mobile device (e.g., 133) is assessed a (relative) discrete rank of "3" (illustrated by first FVR 402) pertaining to the likelihood of a future visit to first network 202. The mobile device attains a (higher) rank of "1" (illustrated by second FVR 403) pertaining to the likelihood of a future visit to second network 204.

Figure 5:
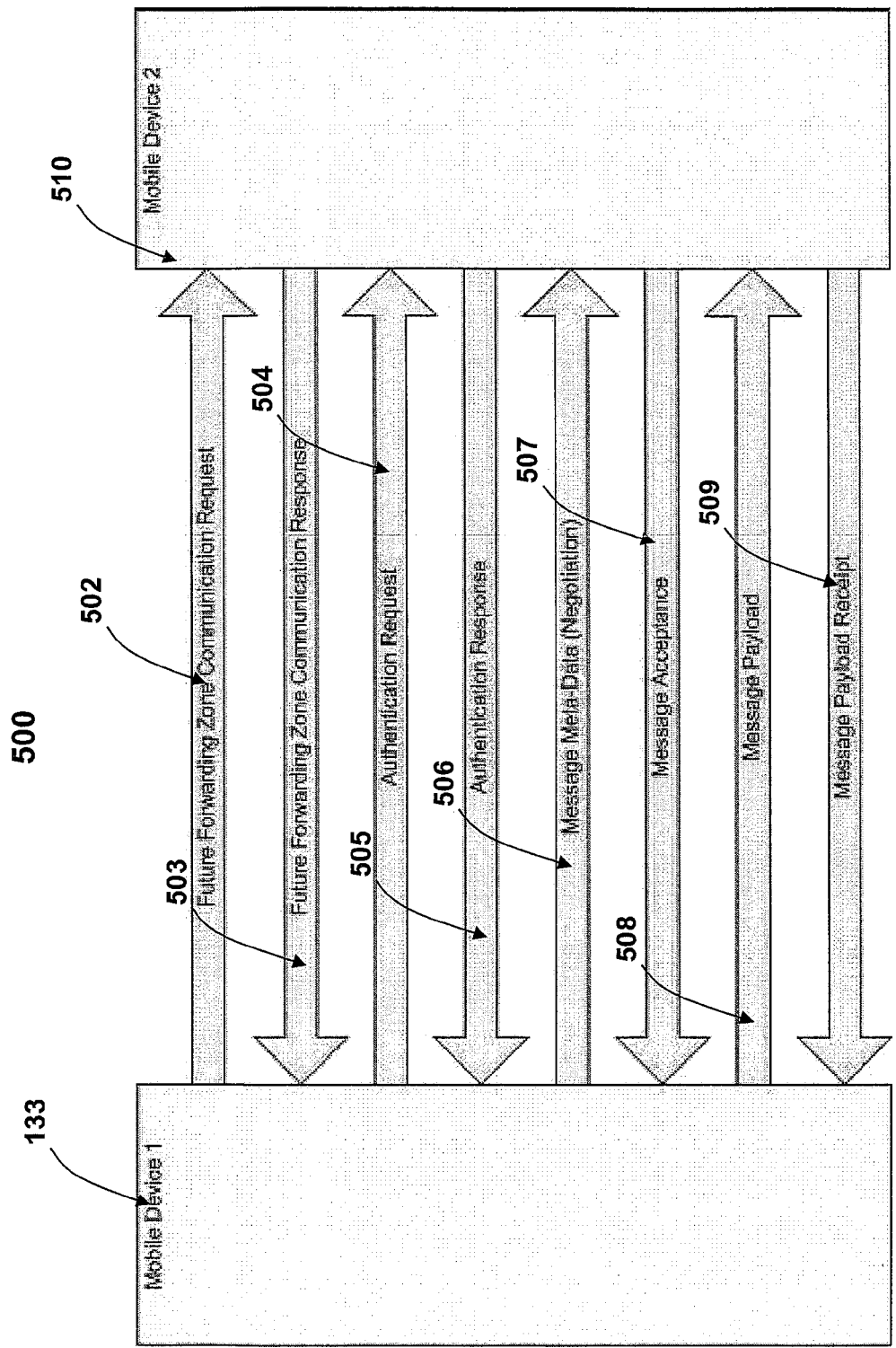
FIG. 5 illustrates a flow of network communication messages required for a message to be accepted for future transmission, according to one embodiment.

FIG. 5 illustrates a flow of network communication messages required for a message to be accepted for future transmission, according to one embodiment. Message flow 500 depicts a sequence of exchanges (messages) between mobile device-1 133 and mobile device-2 510.

The sequence of messages in message flow 500 is initiated when mobile device-1 133 sends an FFZP request (502) to mobile device-2 510. Mobile-2 device 510 returns discrete rankings in an FFZP response (503) for the probability of entering zones assigned by the FFZP to mobile device-1 133. Based on the received rankings, mobile device-1 133 proceeds with the authentication process by sending authentication request 504 to mobile device-2 510. The authentication process is completed when mobile device-1 133 receives authentication response 505 from mobile device-2 510. Following successful authentication, message negotiation 506 is initiated by mobile device-1 133. Message acceptance 507 is subsequently sent by mobile device-2 510 and is received by mobile device-1 133. In response to the receipt of message acceptance 507, mobile device-1 133 transfers message payload 508, and upon receipt of message payload 508, mobile device-2 510 responds by transmitting message payload receipt 509.

Figure 6:
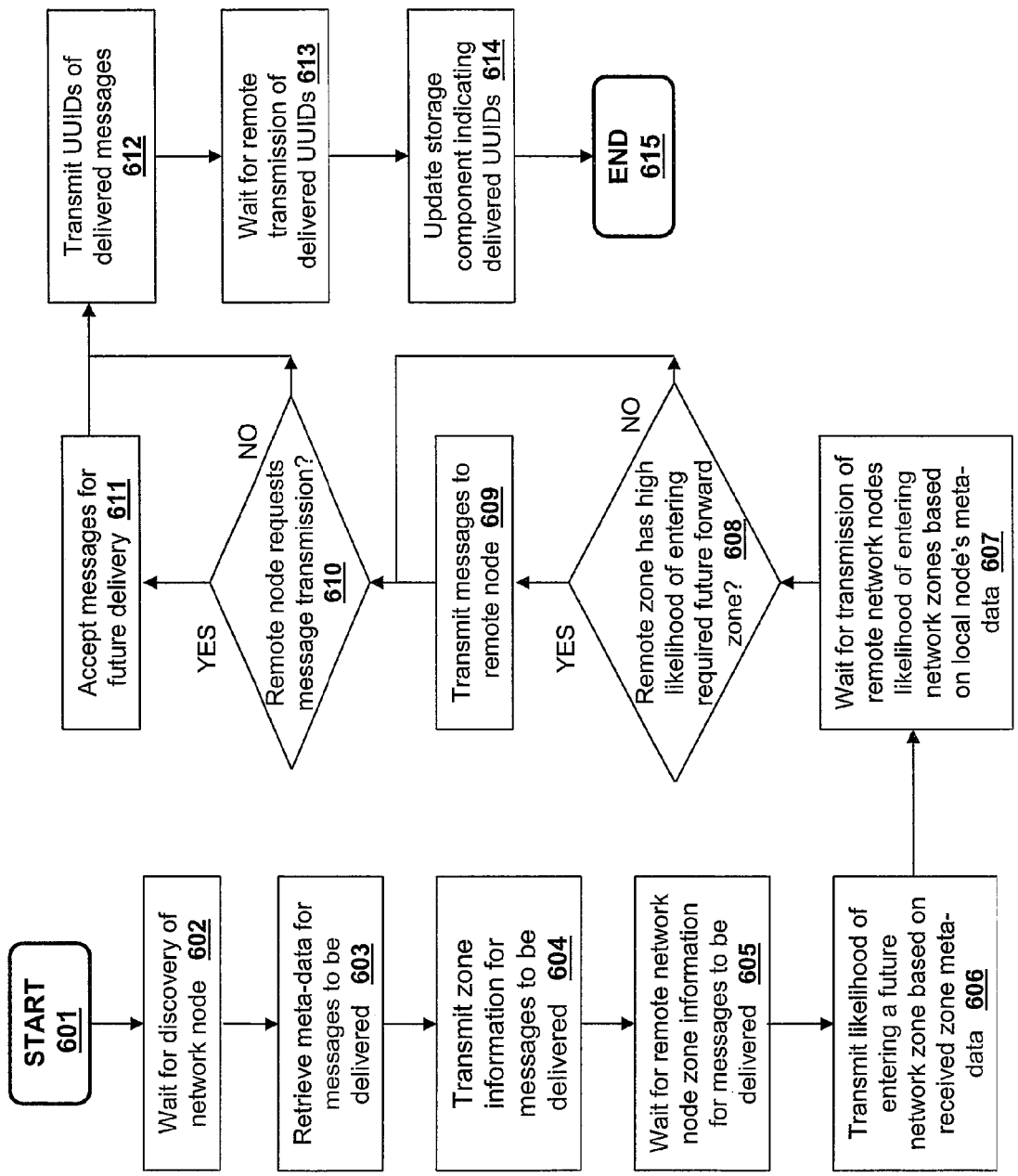
FIG. 6 is a flowchart illustrating a standard inter-node communication flow, according to one embodiment.

FIG. 6 is a flowchart illustrating a standard inter-node communication flow, according to one embodiment. Although the methods illustrated in FIG. 6 may be described with reference to components shown in FIGS. 1-5, it should be understood that this is merely for convenience and alternative components and/or configurations thereof can be employed when implementing the various methods. Key portions of the methods may be completed by PMC utility 110 executing within DPS 100 (FIG. 1) and controlling specific operations of/on DPS 100, and the methods are thus described from the perspective of either/both PMC utility 110 and DPS 100.

The process of FIG. 6 begins at initiator block 601 and proceeds to block 602, at which PMC utility 110 awaits discovery of mobile device/station 133 representing a first network node (facilitated by the Inter-Node Communication Component) by a carrier mobile device representing a second network node and vice versa. At block 603, PMC utility 110 retrieves the meta-data for messages to be delivered.

As shown at block 604, mobile device 133 transmits zone information for messages to be delivered, based on an entrance of mobile device (133) into individual network spaces. At block 605, PMC utility 110 awaits remote network node zone information for messages to be delivered. The FFZPC facilitates a transmission of information pertaining to the likelihood of device entrances into a future network zone based on the received zone meta-data, as shown at block 606. At block 607, PMC utility 110 awaits the transmission of the remote network node's likelihood of entering network zones based on meta-data from local node (currently holding the message).

At decision block 608, PMC utility 110 determines whether the remote node's zone information (i.e., the likelihood of entering a future network zone of a candidate carrier mobile in a remote network space) indicates a higher likelihood of entering the required future forward zone compared with the likelihood of entrance into the future forward zone by the current carrier (message holder) mobile. If at block 608 PMC utility 110 determines that the remote node's zone information indicates a higher likelihood of entering the required future forward zone, the process proceeds to block 609, at which, PMC utility 110 triggers the transmission of messages to a remote carrier mobile device in the remote network space. If at block 608 PMC utility 110 determines that the remote node's zone information indicates a lower likelihood of entering the required future forward zone, the process proceeds to block 610, at which, PMC utility 110 determines whether the remote node requests message transmission.

In one embodiment, a remote node (i.e., a candidate carrier mobile device) may still request the message based on other factors including an intention of the remote user associated with the remote mobile device to enter into a particular network space, contrary to indications provided by the likelihood data. If at block 610 PMC utility 110 determines that the remote node requests to receive the message, the process proceeds to block 611, at which the messages are received on behalf of the remote carrier for future delivery. If at block 610 PMC utility 110 determines that the remote node makes no request to receive the message, the process proceeds to block 612, at which PMC utility 110 initiates transmission of the UUIDs of messages delivered to a future network zone. At block 613, PMC utility 110 awaits remote transmission(s) pertaining to the delivered UUIDs. PMC utility 110 updates storage component indicating the delivery of the UUIDs. The process ends at block 615.

Figure 7:
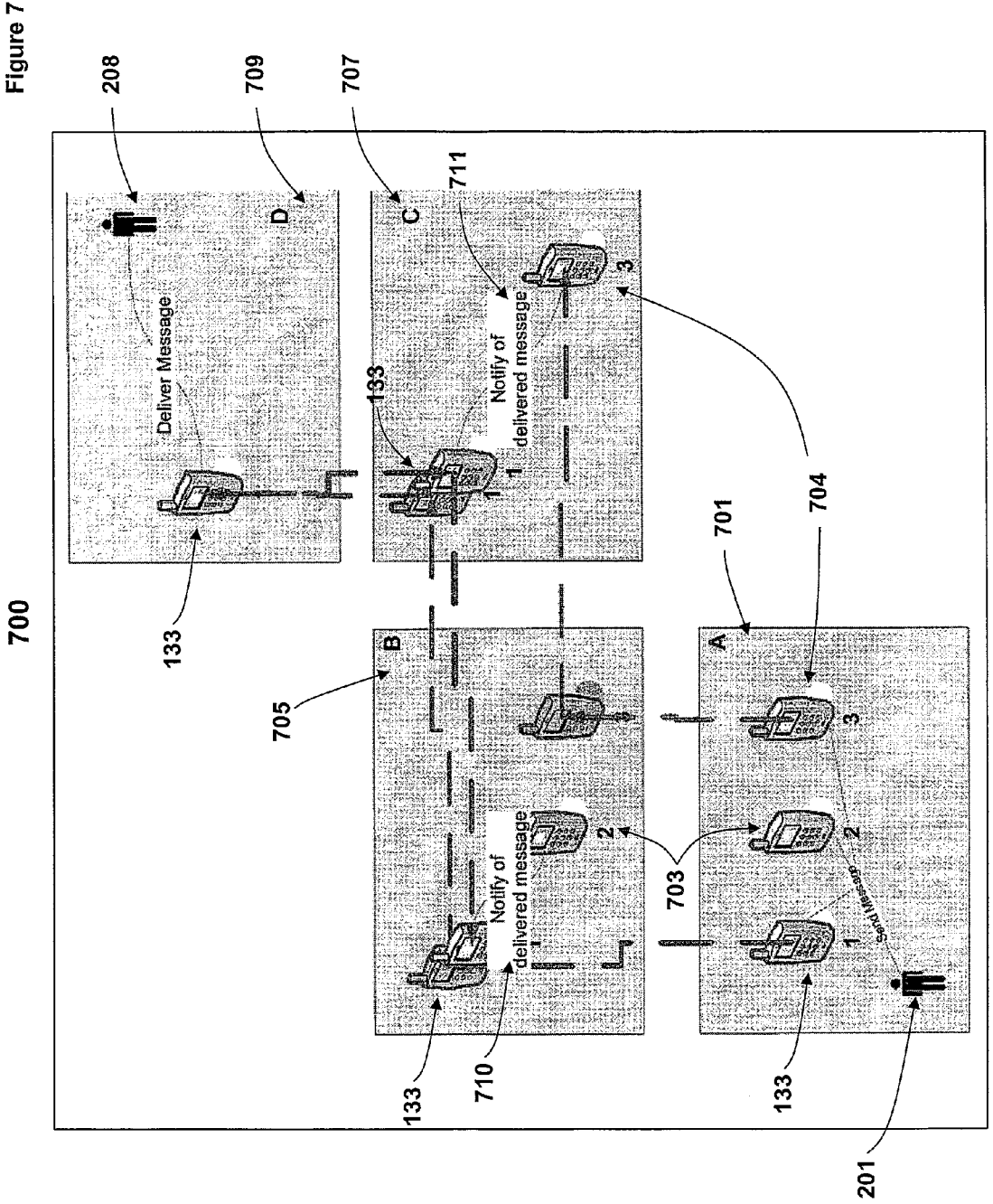
FIG. 7 illustrates a high-level view of message delivery using future forwarding zone technology, according to one embodiment.

FIG. 7 illustrates a high-level view of message delivery using future forwarding zone technology, according to one embodiment. Zone collection 700 comprises zone A 701, zone B 705, zone C 707 and zone D 709. Zone A 701 comprises originating mobile device/station (201) and three (3) carrier mobiles, CM-1 133, CM-2 703 and CM-3 704. Carrier mobiles, CM-1 133, CM-2 703 and CM-3 704 are also illustrated within zone B 705. Included within zone B 705 is second message notification 710. In addition, carrier mobiles, CM-1 133 and CM-3 704 are illustrated within zone C 707. Also included within zone C 707 is first message notification 711. Carrier mobile CM-1 133 is also illustrated within zone D 709.

In zone A 701, (originating) mobile device (201) transmits data (ultimately destined for target device 208 in zone D 709) to three (3) carrier mobiles, CM-1 133, CM-2 703 and CM-3 704. CM-1 133 may be a likely candidate (based on the FFZPC) for reception and subsequent transfer of the originating message in all network zones (701, 705, 707 and 709). When CM-1 133 arrives in zone B 705, CM-1 133 receives and transfers the message to the likely carrier mobiles including the same CM-1 133 in zone C 707. CM-1 133 transfers the message using one or more protocols (which may increase a probability of successful delivery) to zone C 707. Additionally, CM-3 704 transfers the message from zone A 701 via zone B 705 to zone C 707. From zone C 707, CM-1 133 transfers the message to zone D 709. PMC utility 110 enables a receipt of the message by CM-1 133 and subsequent transfer of the message to target device 208. CM-1 133 provides CM-2 703 in zone B 705 with notification (710) of the delivered message. Similarly, CM-1 133 provides CM-3 704 in zone C 707 with notification (711) of the delivered message. In one embodiment, CM-3 704 receives first notification 711 in zone C 707 because, at the time of message delivery and/or notification, CM-3 704 has entered zone C 707. Similarly, CM-2 703 receives second notification 710 in zone B 705 because, at the time of message delivery and/or notification, CM-2 703 is in zone B 705.

Figure 8:
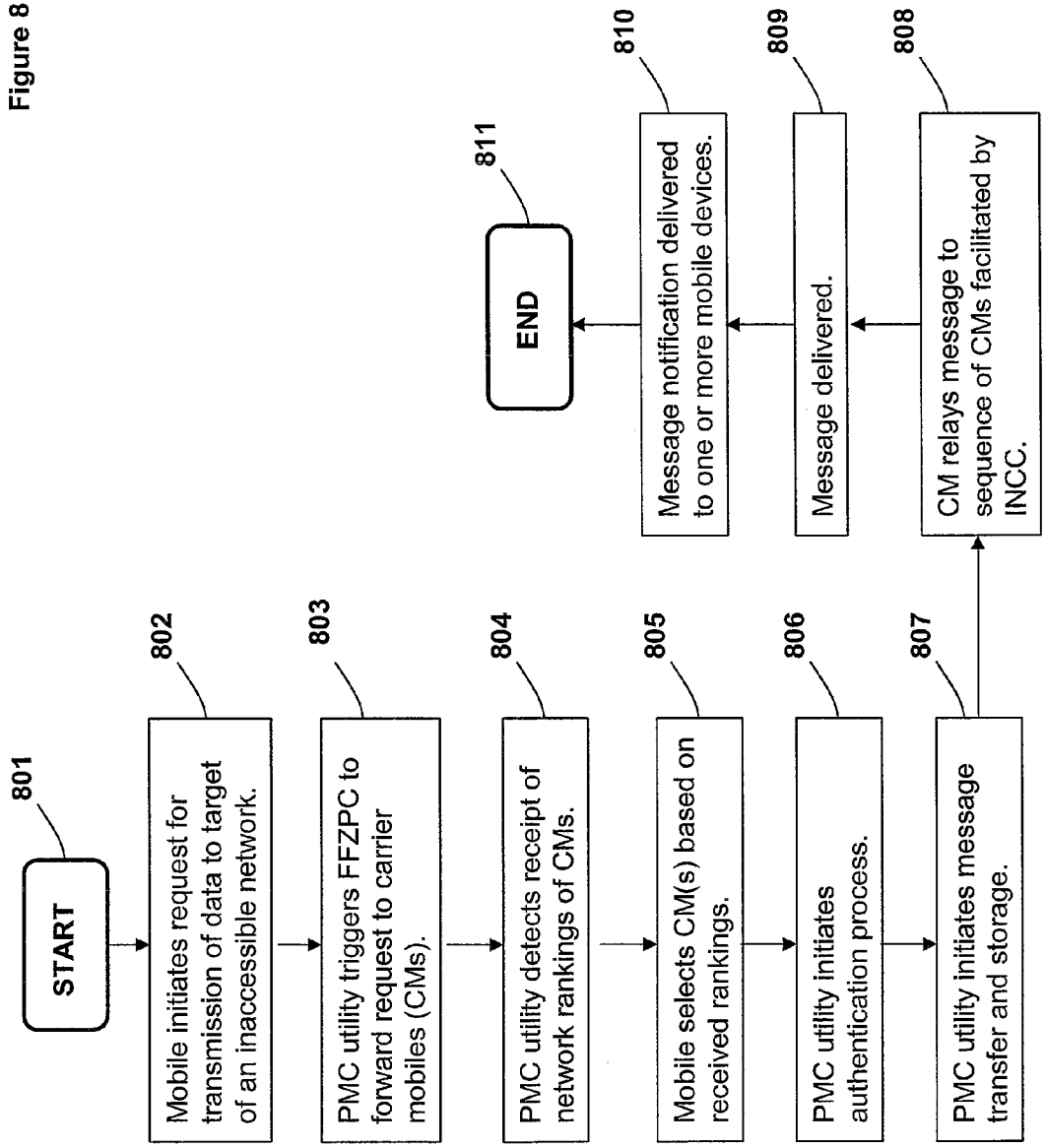
FIG. 8 is a flow chart illustrating the process of initiating and completing a transmission of data from a mobile device to a target device via one or more carrier mobile devices, according to one embodiment.

FIG. 8 is a flow chart illustrating the process of initiating and completing a transmission of data from a mobile device to a target device via one or more carrier mobile devices, according to one embodiment. Although the methods illustrated in FIG. 8 may be described with reference to components shown in FIGS. 1-7, it should be understood that this is merely for convenience and alternative components and/or configurations thereof can be employed when implementing the various methods. Key portions of the methods may be completed by PMC utility 110 executing within DPS 100 (FIG. 1) and controlling specific operations of/on DPS 100, and the methods are thus described from the perspective of either/both PMC utility 110 and DPS 100.

The process of FIG. 8 begins at initiator block 801 and proceeds to block 802, at which an (originating) mobile station (201) initiates request for transmission of data to a target of an inaccessible network (i.e., inaccessible to the mobile station). At block 803, PMC utility triggers the FFZP component to forward/broadcast the request to one or more carrier mobile devices (CMs). The FFZP initiates a process to return (to mobile station 201) discrete rankings for the probability of entering zones assigned by the FFZP to the individual mobile devices. PMC utility 110 detects receipt of the rankings of the CMs at the mobile station, as shown at block 804. Mobile selects CM(s) based on the received rankings, as shown at block 805.

At block 806, PMC utility 110 initiates authentication, negotiation, and notification via the Message Acceptor component between the originating mobile station and the selected CMs. Following successful authentication, negotiation, and notification via the Message Acceptor component, PMC utility initiates message transfer and message storage (while awaiting transfer to a future forward zone), as shown at block 807. At block 808, on receipt of the transferred message, the CM forwards the message to another CM along the path towards the target device, facilitated by the INCC. A sequence of transfers between CMs may be executed before final delivery. The message is finally delivered to the target device (208), as shown at block 809. In response, message notification delivered to one or more mobile devices, as shown at block 810. The process ends at block 811.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and than an illustrative embodiment of the present invention applies equally regardless of the particular type of storage media used to actually carry out the distribution. By way of example, a non-exhaustive list of types of storage media includes recordable type (tangible) media such as floppy disks, thumb drives, hard disk drives, CD ROMs, and DVDs.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a wireless data network having a plurality of mobile devices, a method comprising:
   a processor executing one or more enhanced transmission enabling components (ETECs) to connect an originating mobile device to one or more carrier mobile devices;
   wherein the one or more carrier mobile devices may be moved in and out of one or more network zones,
   wherein the one or more network zones enable forward transmission of data received from the originating device at the one or more carrier mobile devices via an accessible network path,
   wherein said forward transmission occurs using at least one carrier mobile device of the one or more carrier mobile devices and the accessible network path corresponding to a network zone of the one or more network zones in which the at least one carrier mobile device is located, and
   wherein the network zone is a uniquely identifiable network space, and the originating mobile device is located in a first network zone of the one or more network zones;
   communicating, from the originating mobile device to one or more of the one or more carrier mobile devices, a request for at least one of the one or more carrier mobile devices to provide a transmission of data from the originating mobile device to a target device;
   the processor receiving a response from one or more carrier mobile devices of the one or more carrier mobile devices, wherein the response includes zone interaction data for each carrier mobile device that responded to the request, and wherein the response further includes discrete rankings for a probability of entering zones assigned to each carrier mobile device of the one or more carrier mobile devices;
   the processor selecting, based on the received rankings, at least one carrier mobile device from the one or more carrier mobile devices that responded to the request; and
   the processor enabling, based on the zone interaction data, a transmission of a message containing the data from the originating mobile device to the target device utilizing the selected at least one carrier mobile device and accessible network paths of the selected at least one carrier mobile device;
   wherein the target device is located in a second network zone of the one or more network zones unique to the first network zone, and
   wherein the transmission of the message containing the data occurs via transmission of the message containing the data from the originating mobile device to the selected at least one carrier mobile device and then through one or more accessible network paths that are accessible to the selected at least one carrier mobile device but are not accessible to the originating mobile device to complete the transmission of the data to the target device.

2. The method of claim 1, wherein:
   the one or more ETECs comprise a future forwarding zone prediction component (FFZPC) and one or more of: (a) a network zone identification component; (b) a message creation component; (c) a message acceptor component; (d) a storage (data store) component; (e) an inter-node communication component; and (f) a message delivery component;
   the target device exists on a network that is inaccessible to the originating mobile device; and
   said one or more ETECs and said at least one carrier mobile device enable the originating mobile device to accomplish data transmission to the target device without the originating mobile device having direct access to the one or more accessible network paths through which data transmission to the target device occurs.

3. The method of claim 2, further comprising:
   the processor enabling a creation of the message containing the data for transmission between the originating mobile device and the target device;
   wherein said message containing the data comprises one or more of text and data converted to a binary format suitable for transmission to other mobile devices;
   wherein said message is divided into sections including a header and a body, wherein said header contains descriptive information or meta-data about the message and the body and wherein said body contains the data intended for transmission to the target device;
   the processor augmenting one or more messaging protocols to include additional message meta-data in the header, wherein said additional message meta-data includes a Universally Unique Identification (UUID) for the message, security information, cryptography keys and message control data;

the processor integrating information about a level of urgency of the message within said message control data;

the processor storing network details pertaining to an entry of a mobile device into a network space, wherein said network space provides access to a set of unique IP addresses from the mobile device operating within said network space; and the processor identifying the network space by one or more of: topology; reachable IP addresses; available media access control (MAC) addresses; a reachable topology described by a gateway router; and MAC addresses of computing elements including routers within the network space.

4. The method of claim 2, further comprising:

in response to an entry of the at least one carrier mobile device into a network zone among the one or more network zones, the processor detecting when the at least one carrier mobile device has messages for delivery within the network zone entered; and in response to a detection of a message to be delivered from the at least one carrier mobile device when within the network zone, the processor initiating a message delivery component to forward the messages from the at least one carrier mobile device.

5. The method of claim 2, further comprising:

the processor storing information required by various operations of the one or more ETECs, wherein said storing is performed via a storage component, said storage component including a zone storage sub-component, a message storage sub-component, and expiration sub-components;

the processor indexing information required by the various operations of the one or more ETECs;

the processor storing one or more of: information about entrance to network zones; zone network details; and associated zone network information, including a number of times a carrier mobile device enters a zone and a last time of access to the zone of the carrier mobile device;

the processor storing, within said message storage sub-component, a message Universally Unique Identification (UUID), an acceptance timestamp, and a delivery status and message data, wherein said message storage sub-component contains messages accepted by the originating mobile device for delivery on behalf of another mobile device; and the processor initiating expiration of a message from within the message storage sub-component after a preset time interval, based on one or more factors including an indication of message age by a timestamp.

6. A computer program product comprising:

one or more computer readable tangible storage devices medium;

program code, stored on at least one of said computer readable tangible storage devices, for executing one or more enhanced transmission enabling components (ETECs) to connect an originating mobile device to one or more carrier mobile devices;

wherein the one or more carrier mobile devices may be moved in and out of one or more network zones, wherein the one or more network zones enable forward transmission of data received from the originating device at the one or more carrier mobile devices via an accessible network path, wherein said forward transmission occurs using at least one carrier mobile device of the one or more carrier mobile devices and the accessible network path corresponding to a network zone of the one or more network zones in which the at least one carrier mobile device is located, and wherein the network zone is a uniquely identifiable network space, and the originating mobile device is located in a first network zone of the one or more network zones;

program code, stored on at least one of said computer readable tangible storage devices, for communicating, from the originating mobile device to one or more of the one or more of the carrier mobile devices, a request for at least one of the one or more carrier mobile devices to provide a transmission of data from the originating mobile device to a target device;

program code, stored on at least one of said computer readable tangible storage devices, for receiving a response from one or more carrier mobile devices of the one or more carrier mobile devices, wherein the response includes zone interaction data for each carrier mobile device that responded to the request, and wherein the response further includes discrete rankings for a probability of entering zones assigned to each carrier mobile device of the one or more carrier mobile devices;

program code, stored on the at least one of said computer readable tangible storage devices, for selecting, based on the received rankings, at least one carrier mobile devices from the one or more carrier mobile devices that responded to the request; and program code, stored on at least one of said computer readable tangible storage devices, for enabling, based on the zone interaction data, a transmission of a message containing the data from the originating mobile device to the target device utilizing the selected at least one carrier mobile device and accessible network paths of the selected at least one carrier mobile device;

wherein the target device is located in a second network zone of the one or more network zones unique to the first network zone, and wherein the transmission of the message containing the data occurs via transmission of the message containing the data from the originating mobile device to the selected at least one carrier mobile device and then through one or more network paths that are accessible to the selected at least one carrier mobile device but are not accessible to the originating mobile device to complete the transmission of the data to the target device.

7. The method of claim 2, further comprising:

the processor receiving a transmission from a carrier mobile device to the originating mobile device of one of an acceptance or a rejection of messages for future delivery; and the processor initiating authentication of the originating mobile device before accepting the data for future transmission;

wherein said initiating authentication of the originating mobile device comprises authentication via one or more methods, including transmission of a public key within a message header of the message, and wherein an acceptance of the message occurs when the carrier mobile device contains a private key to decrypt the message.

8. The method of claim 2, further comprising:
the processor determining when the message is accepted for delivery to a future network zone; and
the processor providing notification to the originating mobile device that the message is accepted or rejected for future delivery;
wherein an acceptance of the message for delivery to a future network zone includes receiving an indication of approval by a candidate carrier mobile device to accept the message.

9. The method of claim 1, further comprising:
the processor receiving from said originating mobile device the message composed with an option to include a future forwarding zone for delivery;
the processor assessing a likelihood of entering the future forwarding zone based on an initiation of communications between a future forwarding zone prediction component (FFZPC) and a zone prediction component;
the processor rejecting the message when one or more of the following occurs: discovery of a likelihood value which is less than a preset threshold level; and a decision by the originating mobile device upon receipt of the likelihood value to avoid transmission of the message via a particular candidate carrier mobile device.

10. The method of claim 8, further comprising:
in response to an agreement by a carrier mobile device and the candidate carrier mobile device to transmit the message, the processor: (a) placing the message within the storage component for future delivery; and (b) activating a notification component;
the processor initiating a swap of a message previously accepted for future delivery for a current message from the originating mobile device, wherein said swap is conducted based on one or more of: an amount of space remaining in a storage system; and a likelihood of delivery; and
the processor expiring the swapped messages after a specified time or number of network zones entered or after the swapped messages have traveled between a number of network zones without final delivery of the message.

11. The method of claim 5, further comprising:
the processor informing one or more other sub-components and other components with a copy of the message when the message is delivered to the target device;
the processor performing an Inter-Node communication (INC) to increase a likelihood of message delivery to future zones, wherein said INC occurs when a first mobile device discovers a second mobile device, and wherein an ability of the first mobile device to discover the second mobile device and vice versa is facilitated by one or more networking protocols;
in response to discovery of one or more mobile devices, the processor accessing respective storage components to compare messages for future delivery; and
the processor transmitting the message to a remote candidate carrier mobile device for delivery, based on a higher likelihood of entering a destination zone of the message;
wherein a destination zone represents one or more of a preferable next hop and a target destination.

12. The method of claim 5, further comprising:
the processor initiating a communication of one or more lists of Universally Unique Identifications (UUIDs) between mobile devices participating in a transfer of a message corresponding to the UUIDs;
the processor updating the storage component to indicate a delivery of the message corresponding to the UUIDs, upon receipt of the message corresponding to the UUIDs by one of a carrier mobile device and a target mobile device; and
the processor triggering a reduction in storage requirements of a set of ETECs by removing a copy of the message corresponding to the UUIDs from the storage components for each mobile device that transfers the message corresponding to the UUIDs.

13. The method of claim 12, wherein said triggering a reduction in storage requirements further comprises the processor performing at least one of:
removing one or more network zones that have not been accessed in a preset duration from a data store of available future network zones;
removing one or more messages that have been stored for a preset duration;
removing one or more least recently used messages in response to a request for storage occurring; and
removing one or more largest message entries in response to a request for storage occurring.

14. The method of claim 5, further comprising:
the processor transmitting zone information for messages to be delivered, based on an entrance of a carrier mobile device into a network space;
in response to making a node discovery, the processor accessing the data storage component and comparing messages for future delivery with the discovered node;
in response to a remote node having a higher likelihood of entering a zone that a message is destined for, the processor transmitting the message to the remote node for delivery;
the processor communicating a list of recently delivered message UUIDs between the carrier mobile device and the remote node; and
the processor updating the storage component to indicate that the message is delivered.

15. A mobile device comprising:
a processor;
a data store component coupled to the processor;
a network interface device for coupling a carrier mobile device to one or more networks;
a mechanism for communicating between the mobile device and a second mobile device; and
a utility executing on the processor and which enables communication processes via the network interface device and the mechanism for communicating, said utility comprising processing code for enabling one or more enhanced transmission enabling components (ETECs) that execute within the mobile device to provide the following functions:
when the mobile device is an originating mobile device from which a message is desired to be transmitted from the originating mobile to a target device which is not directly accessible to the originating mobile device via a connected network:
communicating, from the originating mobile device to one or more carrier mobile devices, a request for the one or more carrier mobile devices to provide a transmission of data from the originating mobile device to the target device;
wherein the one or more carrier mobile devices may be moved in and out of one or more network zones,
wherein the one or more network zones enable forward transmission of data received from the originating device at the one or more carrier mobile devices via an accessible network path, wherein said forward transmission occurs using at least one carrier mobile device of the one or more carrier mobile devices and the accessible network path corresponding to a network zone of the one or more network zones in which the at least one carrier mobile device is located, and wherein the network zone is a uniquely identifiable network space, and the originating mobile device is located in a first network zone of the one or more network zones;

receiving a response from at least one of the one or more carrier mobile devices, wherein the response includes zone interaction data for each carrier mobile device that responded to the request, and wherein the response further includes discrete rankings for a probability of entering zones assigned to each carrier mobile device of the one or more carrier mobile devices;

selecting, based on the received rankings, at least one carrier mobile device from the one or more carrier mobile devices that responded to the request; and enabling, based on the zone interaction data, a transmission of a message containing the data from the originating mobile device to the target device utilizing the selected at least one carrier mobile device and accessible network paths of the selected at least one carrier mobile device;

wherein the target device is located in a second network zone of the one or more network zones unique to the first network zone, and wherein the transmission of the message containing the data occurs via transmission of the message containing the data from the originating mobile device to the selected at least one carrier mobile device and then through one or more network paths that are accessible to the selected at least one carrier mobile device but are not accessible to the originating mobile device to complete the transmission of the data to the target device.

16. The mobile device of claim 15, wherein when the mobile device is a carrier mobile device that supports the transmission from a different originating mobile device to the target device, the one or more ETECs execute within the carrier mobile device to provide the following functions:

in response to an entry of the carrier mobile device into a network zone among the one or more network zones, detecting when the carrier mobile device has messages for delivery within the network zone entered; and in response to a detection of a message to be delivered from the carrier mobile device when within the network zone, initiating a message delivery component to forward the detected message from the carrier mobile device along a network path towards the target device.

17. The method of claim 1, wherein the network zone is uniquely identifiable by one or more of:

a topology of the network zone;

one or more reachable IP addresses within the network zone;

one or more media access control (MAC) addresses available within the network zone;

a reachable topology described by a gateway router within the network zone; and one or more MAC addresses of specific computing elements within the network zone.

18. The mobile device of claim 15, wherein the network zone is uniquely identifiable by one or more of:

a topology of the network zone;

one or more reachable IP addresses within the network zone;

one or more media access control (MAC) addresses available within the network zone;

a reachable topology described by a gateway router within the network zone; and one or more MAC addresses of specific computing elements within the network zone.

* * * * *